United States Patent
Hung et al.

(10) Patent No.: US 11,500,481 B1
(45) Date of Patent: Nov. 15, 2022

(54) ACTIVE PEN AND TOUCH SYSTEM

(71) Applicant: ILI TECHNOLOGY CORP., Hsinchu County (TW)

(72) Inventors: Chia-Yu Hung, Hsinchu County (TW); Yifan Lin, Hsinchu County (TW)

(73) Assignee: ILI TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 17/536,126

(22) Filed: Nov. 29, 2021

(30) Foreign Application Priority Data

Jun. 30, 2021 (TW) .................... 110207599

(51) Int. Cl.
*G06F 3/038* (2013.01)
*G06F 3/0354* (2013.01)
*G06F 3/044* (2006.01)
*G06F 3/041* (2006.01)
*H04W 72/04* (2009.01)

(52) U.S. Cl.
CPC ........ *G06F 3/0383* (2013.01); *G06F 3/03545* (2013.01); *G06F 3/0441* (2019.05); *G06F 3/04162* (2019.05); *H04W 72/042* (2013.01); *H04W 72/0413* (2013.01)

(58) Field of Classification Search
CPC .. G06F 3/0383; G06F 3/0441; G06F 3/04162; G06F 3/03545; H04W 72/0413; H04W 72/042
See application file for complete search history.

(56) References Cited

U.S. PATENT DOCUMENTS

| | | | |
|---|---|---|---|
| 9,495,024 B2 | 11/2016 | Watanabe | |
| 9,652,058 B2 | 5/2017 | Watanabe | |
| 10,078,379 B2 | 9/2018 | Watanabe | |
| 10,466,816 B2 | 11/2019 | Watanabe | |
| 10,860,119 B2 | 12/2020 | Watanabe | |
| 2018/0018031 A1* | 1/2018 | Fleck | G06F 3/03545 |
| 2018/0120962 A1 | 5/2018 | Hara et al. | |
| 2019/0204939 A1* | 7/2019 | Ju | G06F 3/04883 |

(Continued)

FOREIGN PATENT DOCUMENTS

| | | |
|---|---|---|
| CN | 109388254 | 2/2019 |
| CN | 109791445 | 5/2019 |

(Continued)

OTHER PUBLICATIONS

"Office Action of China Counterpart Application", dated Jul. 7, 2022, p. 1-p. 14.

*Primary Examiner* — Lisa S Landis
(74) *Attorney, Agent, or Firm* — JCIPRNET

(57) ABSTRACT

An active pen is provided. The active pen includes a first transceiver and a first control circuit. The first transceiver is configured to receive uplink information and send corresponding touch coordinate information, first-type downlink information, and second-type downlink information through at least one data channel. The first control circuit is coupled to the first transceiver. The first control circuit generates the touch coordinate information and multiple downlink information based on the uplink information and classifies the downlink information into the first-type downlink information or the second-type downlink information according to the amount of data and a required transmission frequency thereof. A touch system including the active pen is also provided.

13 Claims, 7 Drawing Sheets

(56) References Cited

U.S. PATENT DOCUMENTS

| | | | |
|---|---|---|---|
| 2020/0050296 A1* | 2/2020 | Fleck | G06F 3/03545 |
| 2020/0050339 A1 | 2/2020 | Choi et al. | |
| 2020/0159342 A1 | 5/2020 | Gray et al. | |

FOREIGN PATENT DOCUMENTS

| | | |
|---|---|---|
| CN | 111033453 | 4/2020 |
| CN | 111078030 | 4/2020 |
| CN | 112106014 | 12/2020 |
| CN | 112352211 | 2/2021 |
| CN | 112817466 | 5/2021 |
| TW | 201407427 | 2/2014 |
| TW | I510999 | 12/2015 |

* cited by examiner

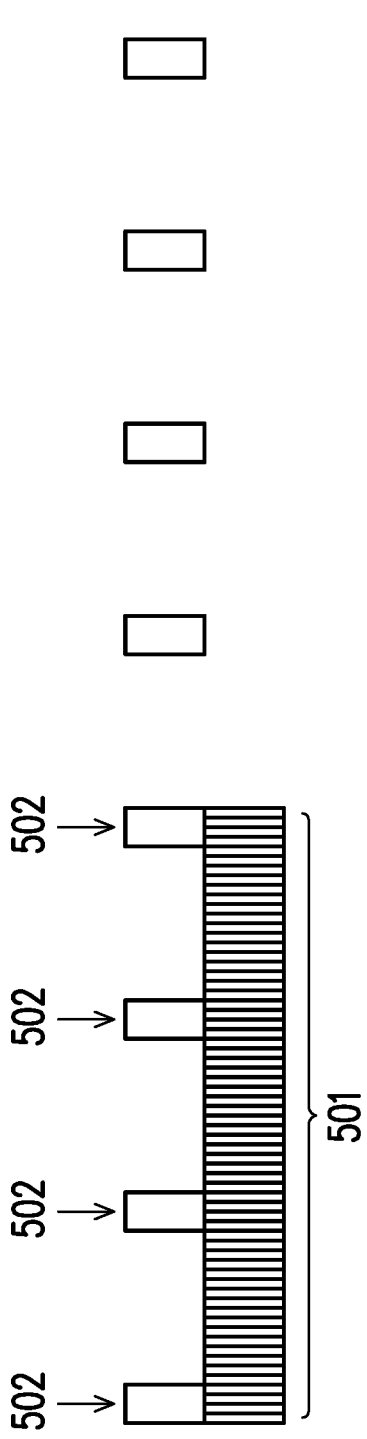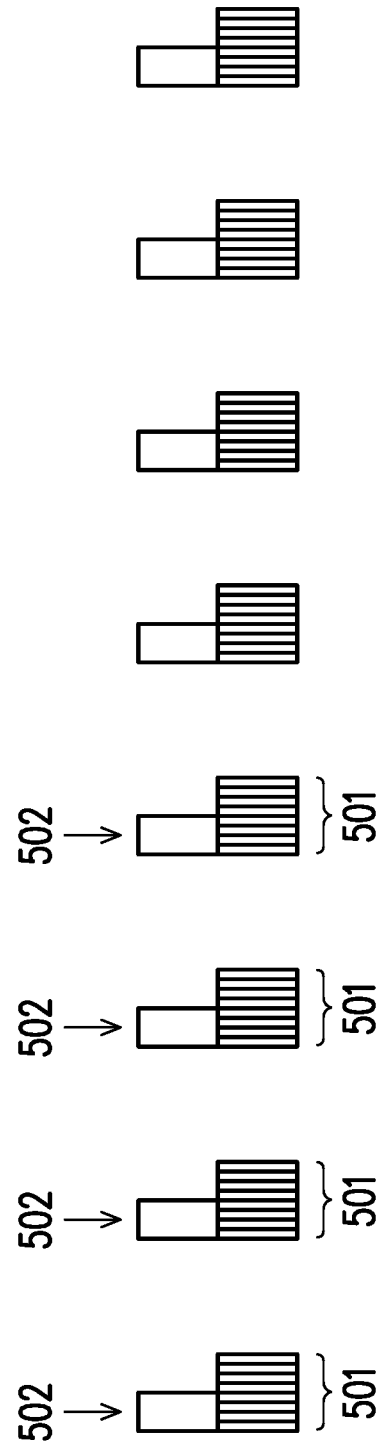

ACTIVE PEN AND TOUCH SYSTEM

CROSS-REFERENCE TO RELATED APPLICATION

This application claims the priority benefit of Taiwan application serial no. 110207599, filed on Jun. 30, 2021. The entirety of the above-mentioned patent application is hereby incorporated by reference herein and made a part of this specification.

BACKGROUND

Technical Field

The disclosure relates to an active pen, and more particularly to an active pen with a data classification function.

Description of Related Art

In touch technology nowadays, it has become a major trend to provide an active pen to perform touch operations on an electronic apparatus. The active pen is an input device that includes internal electronic elements for providing various data about pen position, pressure, hover state, ink state, button press state, battery state, and other functions of the pen. After packed into a multi-bit packet and added with cyclic redundancy check (CRC) data, the above data (referred to as downlink information) are transmitted wirelessly through a downlink channel by various keying methods, such as frequency-shift keying (FSK), on-off keying (OOK), and phase-shift keying (PSK).

However, in the existing technology, since only one data channel between an active pen and a touch display panel is provided to transmit the downlink information, data with different attributes and different amounts of information can only be sent at one single transmission rate. Therefore, the transmission method of the existing active pen lacks flexibility and limits transmission performance.

Therefore, a solution is necessary to provide a more flexible transmission mode and thereby improve transmission performance.

SUMMARY

The disclosure provides an active pen that may provide a more flexible transmission mode and improve transmission performance.

The active pen of the disclosure includes a first transceiver and a first control circuit. The first transceiver is configured to receive uplink information and send corresponding touch coordinate information, first-type downlink information, and second-type downlink information through at least one data channel. The first control circuit is coupled to the first transceiver. The first control circuit generates multiple downlink information based on the uplink information for a touch panel receiver to receive the information, and the first control circuit also extracts coordinate information. The first control circuit classifies the downlink information into the first-type downlink information or the second-type downlink information according to the amount of data and a required transmission frequency thereof.

The disclosure provides a touch system that includes the active pen and a touch apparatus. The touch apparatus includes a host. The host includes a second transceiver and a second control circuit. The second transceiver is configured to send the uplink information and receive the touch coordinate information, the first-type downlink information, and the second-type downlink information. The second control circuit is configured to analyze the touch coordinate information, the first-type downlink information, and the second-type downlink information.

In an embodiment of the disclosure, the amount of data of the first-type downlink information is more than the amount of data of the second-type downlink information.

In an embodiment of the disclosure, the transmission frequency of the first-type downlink information is not higher than the transmission frequency of the second-type downlink information.

In an embodiment of the disclosure, the first-type downlink information includes pen pressure information and battery state information, and the second-type downlink information includes button press state information, hover state information, and ink state information.

In an embodiment of the disclosure, the at least one data channel includes a first data channel. The first control circuit is further configured to mix the first-type downlink information and the second-type downlink information and control the first transceiver to send the first-type downlink information and the second-type downlink that are mixed through the first data channel.

In an embodiment of the disclosure, the at least one data channel includes the first data channel and a second data channel. The first control circuit is further configured to control the first transceiver to send the first-type downlink information through the first data channel and control the first transceiver to send the second-type downlink information through the second data channel.

In an embodiment of the disclosure, the first-type downlink information and the second-type downlink information are transmitted in a time division manner by being arranged alternately based on timing.

In an embodiment of the disclosure, the first-type downlink information and the second-type downlink information are transmitted at different frequencies.

In an embodiment of the disclosure, the first-type downlink information and the second-type downlink information are transmitted by orthogonal coding.

Based on the above, the disclosure transmits the downlink information by data classification and through the at least one data channel to provide a more flexible transmission mode and thereby improve transmission performance.

BRIEF DESCRIPTION OF THE DRAWINGS

FIG. 6A is a schematic diagram of the first-type downlink information and the second-type downlink information being transmitted in a frequency division manner.

FIG. 6B illustrates a modified example of the embodiment shown in FIG. 6A.

DESCRIPTION OF THE EMBODIMENTS

Figure 1:
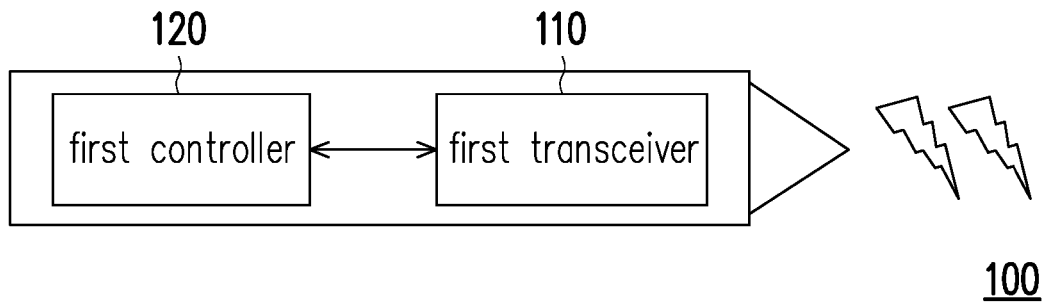
FIG. 1 is a schematic block diagram of an active pen structure according to an embodiment of the disclosure.

FIG. 1 is a schematic block diagram of an active pen structure according to an embodiment of the disclosure. With reference to FIG. 1, an active pen 100 includes a first transceiver 110 and a first controller 120. The first transceiver 110 is configured to receive uplink information and transmit downlink information. In the disclosure, the uplink information refers to information sent from a touch apparatus to the active pen 100, and the downlink information refers to information returned from the active pen 100 to the touch apparatus. The uplink information includes requirement information, synchronization information, and protocol information. The requirement information includes data items designated to be returned, such as touch coordinate information, pen pressure information, button press state information, hover state information, ink state information, and battery state information. The protocol information includes keying methods, keying frequencies, and drive timing. The protocol information is defined in advance when a product is manufactured, including corresponding receive timing, receive frequencies, and codec methods, such that a touch panel and an active pen can match each other. Therefore, a touch panel and an active pen using different protocols cannot communicate with each other. The first controller 120 is coupled to the first transceiver 110 to collect designated information according to the requirement information.

The designated information collected includes primary information and secondary information. The primary information refers to the touch coordinate information, while the secondary information refers to information other than the touch coordinate information. The first controller 120 is configured to classify the secondary information. The first controller 120 may perform classification based on at least one of the amount of data, the required update rate, and the required data correctness. In this embodiment, the secondary information with a large amount of data, a low required update rate (a low real-time requirement), and high required data correctness is classified into the first-type downlink information, such as pen pressure information (8 to 16 bits) and battery state information (2 to 8 bits). In contrast, the secondary information with a small amount of data, a high required update rate (a high real-time requirement), and low required data correctness is classified into the second-type downlink information, such as button press state information (1 to 3 bits) and hover state information (1 bit).

Due to the high required data correctness of the first-type downlink information, the first controller 120 is further configured to generate a cyclic redundancy check (CRC) code or a checksum code according to the first-type downlink information. The generated CRC code or checksum code is appended to the first-type downlink information for a receiving party (the touch apparatus) to check and determine whether the transmitted information has changed. Simply speaking, the CRC code or the checksum code is configured to detect or verify errors that may occur after information transmission. In contrast, due to the small amount of data and the low required data correctness of the second-type downlink information, the first controller 120 does not generate the CRC code or the checksum code based on the amount of data of the second-type downlink information. In an embodiment, the second-type downlink information may avoid errors merely by debounce of data thereof. The downlink information may be transmitted wirelessly through the downlink channel by phase shift keying methods, such as frequency shift keying (FSK), binary phase shift keying (BPSK), quadrature phase shift keying (QPSK), differential binary phase shift keying (DBPSK), differential quadrature phase shift keying (DQPSK), and combinations thereof.

Figure 2:
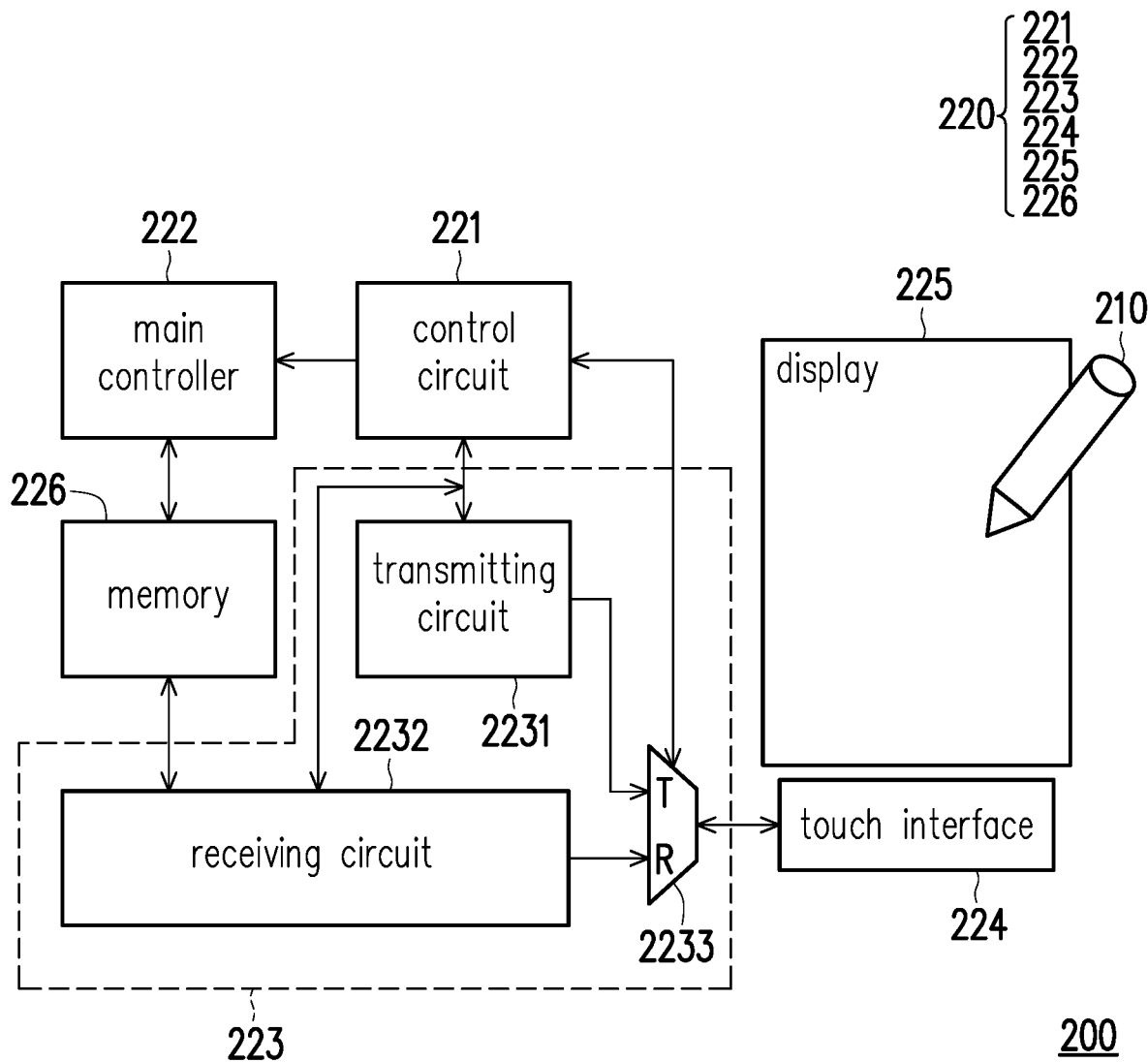
FIG. 2 is a schematic block diagram of a touch system according to an embodiment of the disclosure.

FIG. 2 is a schematic block diagram of a touch system according to an embodiment of the disclosure. With reference to FIG. 2, a touch system 200 includes an active pen 210 and a host 220. The architecture of the active pen 210 has been described in detail in the embodiment shown in FIG. 1, and details are not described herein. The host 220 includes a second control circuit 221, a main controller 222, a second transceiver 223, a touch interface 224, a display 225, and a memory 226. The touch interface 224 may be a touch pad. The display 225 and the touch interface 224 may be integrated with each other as a touch display panel.

The second transceiver 223 is coupled to the touch interface 224 and performs signal transmission and reception through the touch interface 224 and the active pen 210. The second control circuit 221 is coupled between the main controller 222 and the second transceiver 223. The second control circuit 221 is configured to analyze the downlink information returned by the active pen 210 according to protocol information corresponding to the active pen 210, so as to obtain one or more operation states of the active pen 210 according to an analysis result. The second control circuit 221 may transmit the determined operation state of the active pen 210 to the main controller 222. The main controller 222 may execute at least one corresponding application operation according to the obtained operation state. The memory 226 is coupled to the main controller 222 and the second transceiver 223. The memory 226 may be configured to provide any information required by the main controller 222 and the second transceiver 223 to perform any actions.

In an embodiment, the second transceiver 223 includes a transmitting circuit 2231, a receiving circuit 2232, and a selector circuit 2233. The transmitting circuit 2231 is coupled to the second control circuit 221 and the selector circuit 2233 for sending a signal to the touch interface 224 and the active pen 210 through the selector circuit 2233. The transmitting circuit 2231 may be configured to send the requirement information to the active pen 210. The receiving circuit 2232 is coupled to the second control circuit 221 and the selector circuit 2233 and receives signals sent by the active pen 210 such as multiple data items through the selector circuit 2233 and the touch interface 224. The selector circuit 2233 is coupled to the second control circuit 221. According to an operation mode signal generated by the second control circuit 221, the selector circuit 2233 couples the receiving circuit 2232 (through an endpoint R) or the transmitting circuit 2231 (through an endpoint T) to the touch interface 224. The selector circuit 2233 may make the second transceiver 223 perform signal transmission or reception according to the operation mode signal.

In an embodiment, the second control circuit 221 may be a digital circuit and/or any form of an analog circuit. The second control circuit 221 may be implemented with any form of a processor having a computing capability known to a person skilled in the art, and is not limited in the disclosure. The memory 226 may be a dynamic random access memory, a static random access memory, a nonvolatile memory, or a combination of the above memories, and is also not limited. In addition, the transmitting circuit 2231, the receiving circuit 2232, and the selector circuit 2233 may also be implemented with relevant circuits known to a person skilled in the art, and is not particularly limited.

Figure 3:
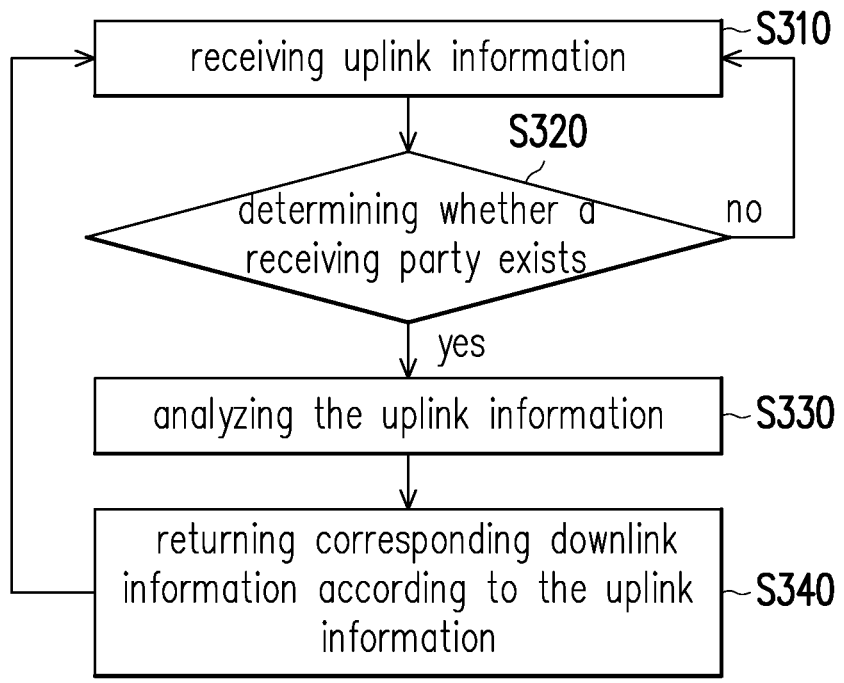
FIG. 3 is a step flow chart of active pen actions according to an embodiment of the disclosure.

FIG. 3 is a step flow chart of active pen actions according to an embodiment of the disclosure. With reference to FIG. 2 and FIG. 3 together, in step S310, the first transceiver of the active pen 210 receives uplink information. In step S320, a first control circuit of the active pen 210 determines whether a receiving party exists. If so, the first control circuit analyzes the received uplink information (step S330). If not, the flow returns to step S310. In step S340, according to the uplink information, the first control circuit returns corresponding downlink information, including touch coordinate information, first-type downlink information, and second-type downlink information.

Figure 4:
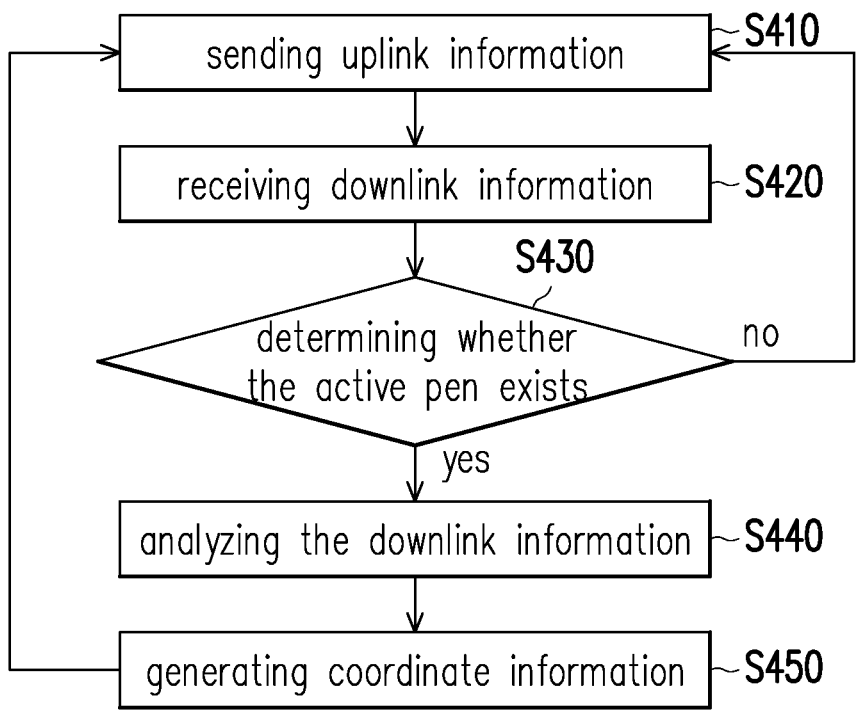
FIG. 4 is a step flow chart of touch apparatus actions according to an embodiment of the disclosure.

FIG. 4 is a step flow chart of touch apparatus actions according to an embodiment of the disclosure. With reference to FIG. 2 and FIG. 4 together, in step S410, the second transceiver 223 of the touch apparatus 220 sends uplink information. In step S420, the second transceiver 223 of the touch apparatus 220 receives downlink information returned by the active pen 210. In step S430, the second control circuit 221 of the touch apparatus 220 determines whether the active pen 210 exists. If so, the received downlink information is analyzed (step S440). If not, the flow returns to step S410. Next, the second control circuit 221 of the touch apparatus 220 generates coordinate information and other digital information according to an analysis result (step S450).

In the disclosure, the first controller 120 may control the first transceiver 110 to return the foregoing first-type downlink information and second-type downlink information through at least one data channel. In an embodiment, one single data channel may be configured to return the first-type downlink information and the second-type downlink information. In an embodiment, two data channels may be configured to respectively return the first-type downlink information and the second-type downlink information. Hereinafter, multiple embodiments are provided to describe multiple transmission methods of the first-type downlink information and the second-type downlink information.

Figure 5A:
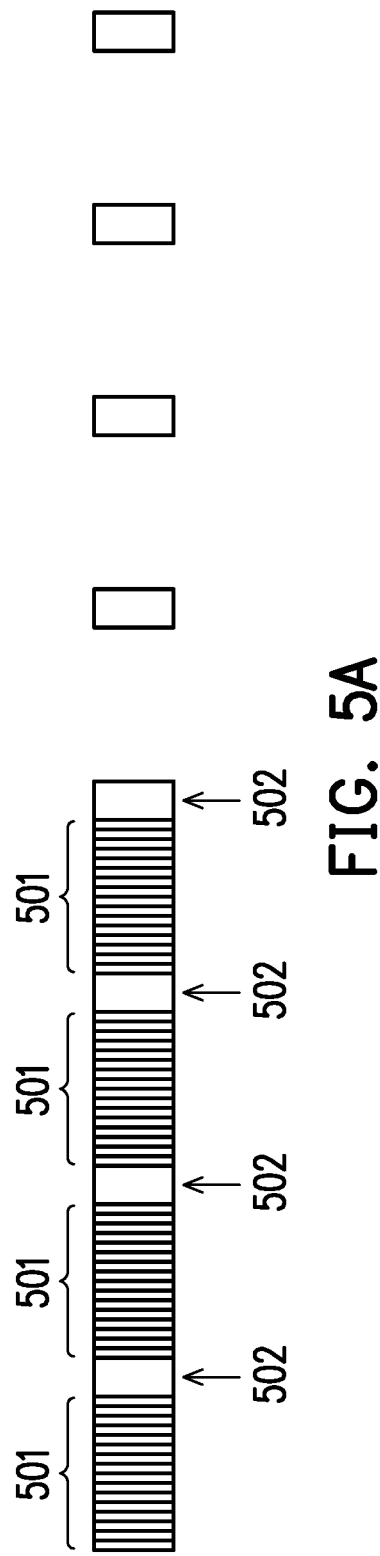
FIG. 5A is a schematic diagram of first-type downlink information and second-type downlink information being transmitted in a time division manner.

FIG. 5A is a schematic diagram of first-type downlink information and second-type downlink information being transmitted in a time division manner. With reference to FIG. 5A, in this embodiment, first-type downlink information 501 and second-type downlink information 502 are transmitted in a time division manner by being arranged alternately based on timing. In other words, transmission periods of the first-type downlink information 501 and transmission periods of the second-type downlink information 502 do not overlap. It can be seen that the first-type downlink information 501 has a large amount of data and is added with the CRC code or the checksum code, while the second-type downlink information 502 has a small amount of data and an update rate higher than that of the first-type downlink information 501.

Figure 5B:
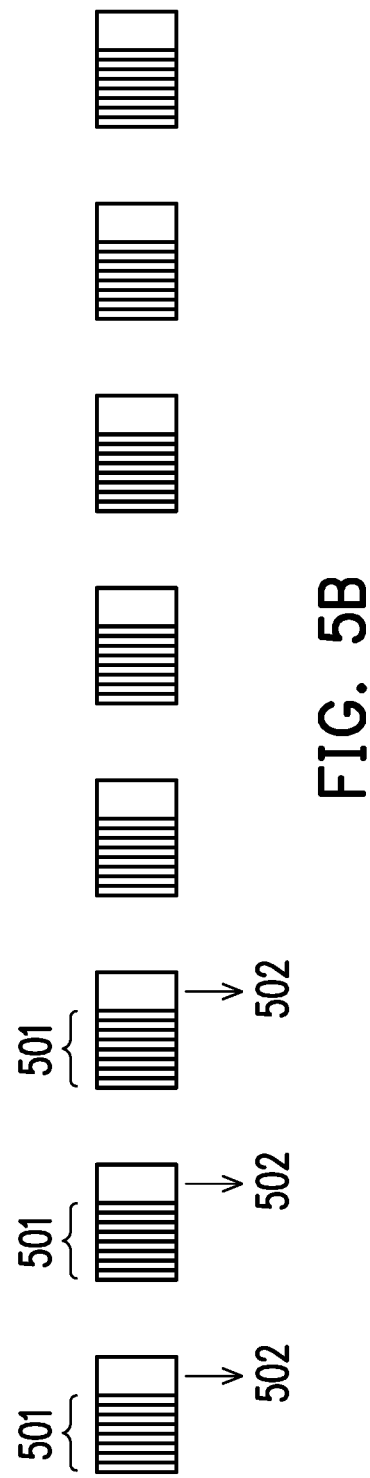
FIG. 5B illustrates a modified example of the embodiment shown in FIG. 5A.

FIG. 5A describes a scenario where long-term transmission of the first-type downlink information 501 is allowed. It can be seen that the first-type downlink information 501 and the second-type downlink information 502 are transmitted in a time division manner by being arranged alternately based on timing within a time interval, and the transmission of the first-type downlink information 501 has been completed at the end of the time interval. FIG. 5B illustrates a modified example of the embodiment shown in FIG. 5A. With reference to FIG. 5B, when long-term transmission is not allowed, the first-type downlink information 501 (added with the CRC code or the checksum code) may be further divided into multiple segments for transmission. In the embodiment shown in FIG. 5A and FIG. 5B, the first-type downlink information 501 and the second-type downlink information 502 may be transmitted in a time division manner based on one single frequency and through one single data channel. The effect of the transmission method in different periods is equivalent to the effect of transmission through two data channels (i.e., the first data channel and the second data channel, which perform transmission in different periods). Alternately, the first-type downlink information 501 and the second-type downlink information 502 may be transmitted based on different frequencies and respectively through two data channels (each channel using a different keying frequency).

FIG. 6A is a schematic diagram of the first-type downlink information and the second-type downlink information being transmitted in a frequency division manner. With reference to FIG. 6A, in this embodiment, the first-type downlink information 501 and the second-type downlink information 502 are transmitted based on different frequencies. It can be seen that a transmission period of the first-type downlink information 501 and transmission periods of the second-type downlink information 502 partially overlap. FIG. 6B illustrates a modified example of the embodiment shown in FIG. 6A. With reference to FIG. 6B. when long-term transmission is not allowed, the first-type downlink information 501 may be further divided into multiple segments for transmission. In the embodiment shown in FIG. 6A and FIG. 6B, the first-type downlink information 501 and the second-type downlink information 502 may be transmitted based on two different frequencies and through one single data channel. The first control circuit of the active pen may mix the first-type downlink information 501 and the second-type downlink information 502, and may control the first transceiver to send the first-type downlink information 501 and the second-type downlink information 502 that are mixed through one single data channel. Alternately, the first-type downlink information 501 and the second-type downlink information 502 may be transmitted based on two different frequencies and through different data channels (two data channels). Among the above, "mix" means the data channels send information by one single electrode or by multiple electrodes.

Figure 7A:
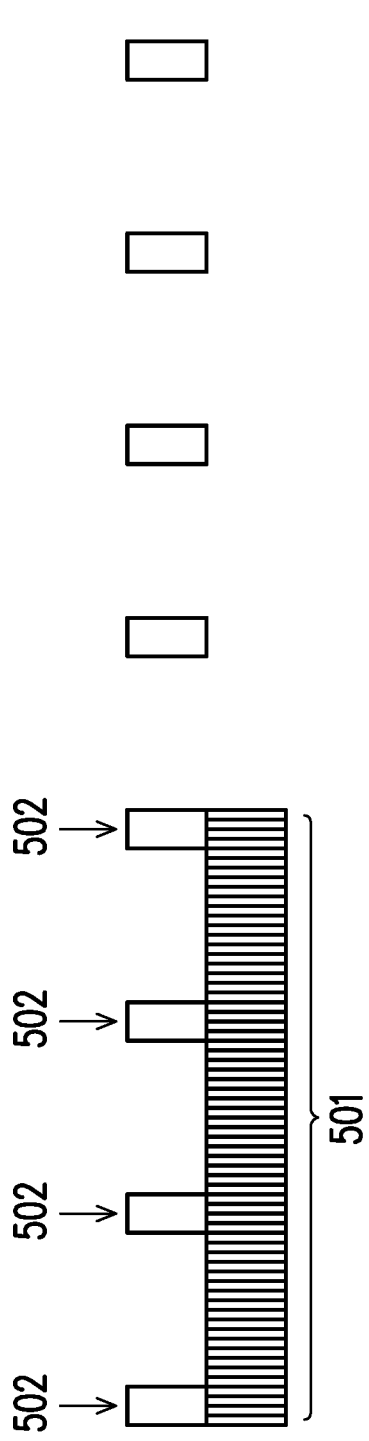
FIG. 7A is a schematic diagram of the first-type downlink information and the second-type downlink information being transmitted in a code division manner.

FIG. 7A shows a schematic diagram of the first-type downlink information and second-type downlink information being transmitted in a code division manner. With reference to FIG. 7A, in this embodiment, a transmission period of the first-type downlink information 501 and transmission periods of the second-type downlink information 502 partially overlap. The first-type downlink information 501 and the second-type downlink information 502 may be encoded by orthogonal or low-correlation codes and then transmitted based on the same frequency. Simply speaking, the first-type downlink information 501 and the second-type downlink information 502 are encoded differently. For example, the encoded first-type downlink information 501 represents original data "0" with "−1, −1" (equivalent to two consecutive negative impulses) and represents original data "1" with "+1, +1" (equivalent to two consecutive positive impulses). The encoded second-type downlink information 502 represents original data "0" with "−1, +1" (equivalent to outputting a positive impulse after a negative impulse) and represents original data "1" with "+1, −1" (equivalent to outputting a negative impulse after a positive impulse).

Figure 7B:
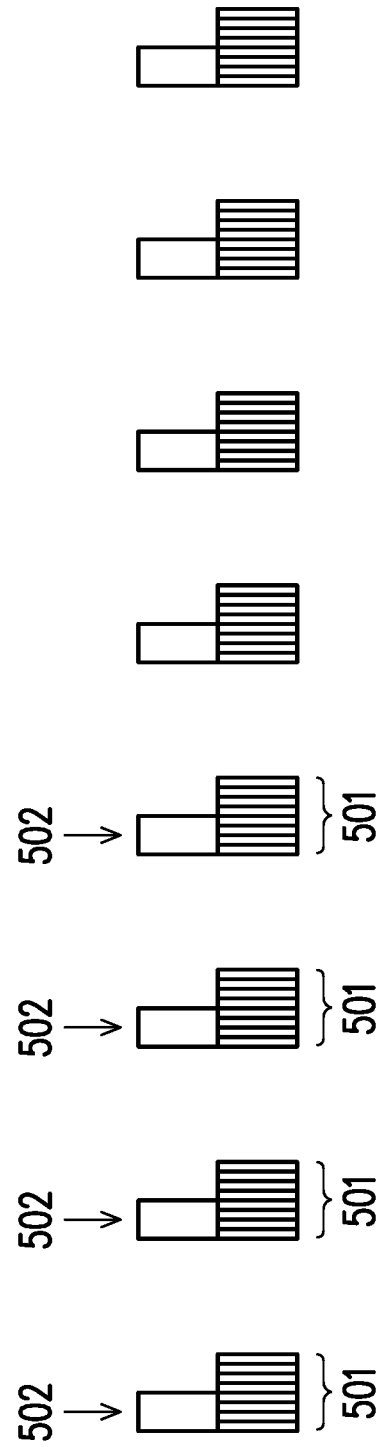
FIG. 7B illustrates a modified example of the embodiment shown in FIG. 7A.

FIG. 7B illustrates a modified example of the embodiment shown in FIG. 7A. With reference to FIG. 7B. when long-term transmission is not allowed, the first-type downlink information 501 may be further divided into multiple segments for transmission. In the embodiment shown in FIG. 7A and FIG. 7B, the first-type downlink information 501 and the second-type downlink information 502 may be transmitted based on the same frequency and different codes and through two data channels (each channel using different codes).

Figure 8A:
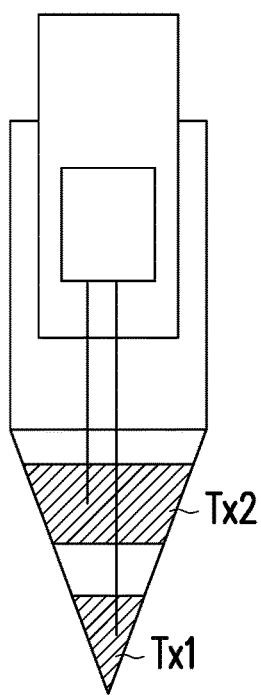
FIG. 8A is a schematic diagram of an active pen having multiple data channels and multiple transmitters.

The above multiple embodiments may have different applications with regard to an active pen having one or more emitters (electrodes). FIG. 8A is a schematic diagram of an active pen having multiple data channels and multiple transmitters. With reference to FIG. 8A, in a case where the active pen has multiple transmitters (such as electrodes Tx1 and Tx2), transmission through multiple data channels may be performed in a frequency division or code division manner, and a reception terminal (the touch apparatus) may mix and receive the downlink information transmitted through different data channels.

Figure 8B:
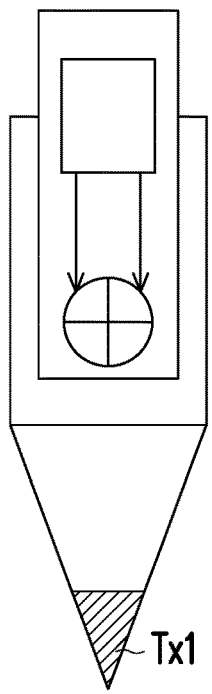
FIG. 8B is a schematic diagram of an active pen having multiple data channels and one single transmitter.

FIG. 8B is a schematic diagram of an active pen having multiple data channels and one single transmitter. With reference to FIG. 8B, in a case where the active pen has only one transmitter (such as the electrode Tx1), transmission through multiple data channels may still be performed in a frequency division or code division manner, but a circuit terminal of the active pen is required to mix the downlink information transmitted through different data channels before transmission.

Figure 8C:
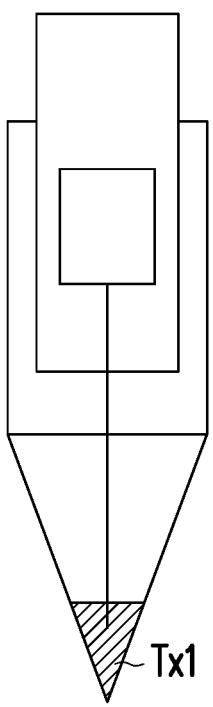
FIG. 8C is a schematic diagram of an active pen having multiple data channels and one single transmitter.

FIG. 8C is a schematic diagram of an active pen having multiple data channels and one single transmitter. With reference to FIG. 8C, in a case where the active pen has only one transmitter (such as the electrode Tx1), transmission through multiple data channels may still be performed in a frequency division or code division manner. The difference between FIG. 8C and FIG. 8B is that in FIG. 8C, signals from multiple data channels are mixed while the downlink information is generated, and the mixed downlink information is transmitted through the transmitter (the electrode Tx1).

Figure 8D:
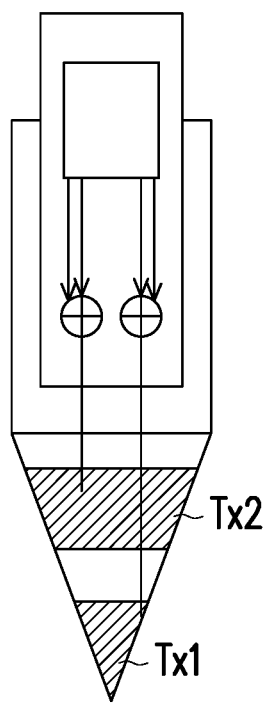
FIG. 8D is a schematic diagram of an active pen having multiple data channels and multiple transmitters.

FIG. 8D is a schematic diagram of an active pen having multiple data channels and multiple transmitters. With reference to FIG. 8A and FIG. 8D, in a case where the number of data channels is more than the number of transmitters, each transmitter (electrode) may be configured to transmit mixed signals from multiple data channels. For example, the electrode Tx1 may be configured to transmit mixed signals of a first data channel and a second data channel, and the electrode Tx2 may be configured to transmit mixed signals of a third data channel and a fourth data channel. The difference between FIG. 8A and FIG. 8D is that in FIG. 8A, signals from multiple data channels are mixed while the downlink information is generated. In FIG. 8D, the downlink information from multiple data channels is mixed by the circuit terminal of the active pen before transmission. It should be noted that although only two data channels are illustrated in FIG. 8A, FIG. 8B, and FIG. 8D, this is merely for simplicity of the drawings. A designer may change the number of data channels (for example, two or more) according to actual needs. Therefore, the number in the drawings of the disclosure should not be interpreted as a limitation on the scope of the disclosure.

It should be noted that in the disclosure, the type of data to be transmitted through the data channels may be determined according to actual needs and restrictions. In addition, the receiving party (the touch apparatus) of the downlink information analyzes the downlink information by at least one of the corresponding receive timing, receive frequencies, and decoding methods.

In summary, in the disclosure, the downlink information is transmitted through data classification and through at least one data channel, such that data with a high real-time requirement and a small amount of data may be transmitted in real time, and data with a low real-time requirement and a large amount of data may maintain the correctness of the transmitted data. As a result, to provide a more flexible transmit mode and improve transmit performance.

What is claimed is:

1. An active pen, comprising:
    a first transceiver, configured to receive uplink information and send touch coordinate information, first-type downlink information, and second-type downlink information that are corresponding through at least one data channel; and
    a first control circuit, coupled to the first transceiver, generating the touch coordinate information and a plurality of downlink information based on the uplink information, and classifying the plurality of downlink information into the first-type downlink information or the second-type downlink information according to an amount of data and a required transmission frequency thereof.

2. The active pen according to claim 1, wherein an amount of data of the first-type downlink information is more than an amount of data of the second-type downlink information.

3. The active pen according to claim 1, wherein a transmission frequency of the first-type downlink information is not higher than a transmission frequency of the second-type downlink information.

4. The active pen according to claim 1, wherein the at least one data channel comprises a first data channel, and the first control circuit is further configured to:
    mix the first-type downlink information and the second-type downlink information, and control the first transceiver to send the first-type downlink information and the second-type downlink information that are mixed through the first data channel.

5. The active pen according to claim 1, wherein the at least one data channel comprises a first data channel and a second data channel, and the first control circuit is further configured to:
    control the first transceiver to send the first-type downlink information through the first data channel; and
    control the first transceiver to send the second-type downlink information through the second data channel.

6. The active pen according to claim 5, wherein the at least one data channel further comprises a third data channel and a fourth data channel, the active pen further comprises a second transceiver, configured to send the first-type downlink information and the second-type downlink information through the third data channel and the fourth data channel, and the first control circuit is further configured to:
    control the first transceiver to send a mixed signal from the first data channel and the second data channel; and control the second transceiver to send a mixed signal from the third data channel and the fourth data channel.

7. The active pen according to claim 1, wherein the first-type downlink information and the second-type downlink information are transmitted in a time division manner by being arranged alternately based on timing.

8. The active pen according to claim 7, wherein the first-type downlink information is split into a plurality of segments for transmission, and a transmission period of each of the plurality of segments of the first-type downlink information does not overlap a transmission period of the second-type downlink information.

9. The active pen according to claim 1, wherein the first-type downlink information and the second-type downlink information are transmitted at different frequencies.

10. The active pen according to claim 9, wherein the first-type downlink information is split into a plurality of segments for transmission, and a transmission period of each of the plurality of segments of the first-type downlink information overlaps a transmission period of the second-type downlink information.

11. The active pen according to claim 1, wherein the first-type downlink information and the second-type downlink information are transmitted by orthogonal coding.

12. The active pen according to claim 11, wherein the first-type downlink information is split into a plurality of segments for transmission, and a transmission period of each of the plurality of segments of the first-type downlink information overlaps a transmission period of the second-type downlink information.

13. A touch system, comprising:
the active pen according to claim 1; and
a touch apparatus, comprising a host, the host comprising:
  a second transceiver, configured to send the uplink information and receive the touch coordinate information, the first-type downlink information, and the second-type downlink information; and
  a second control circuit, configured to analyze the touch coordinate information, the first-type downlink information, and the second-type downlink information.

* * * * *